United States Patent
Hofer et al.

(10) Patent No.: US 11,577,817 B2
(45) Date of Patent: Feb. 14, 2023

(54) SYSTEM AND METHOD FOR COOLING A LEADING EDGE OF A HIGH SPEED VEHICLE

(71) Applicant: General Electric Company, Schenectady, NY (US)

(72) Inventors: Douglas Carl Hofer, Clifton Park, NY (US); Nicholas William Rathay, Rock City Falls, NY (US); Gregory Alexander Natsui, Schenectady, NY (US); Corey Bourassa, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/173,612

(22) Filed: Feb. 11, 2021

(65) Prior Publication Data
US 2022/0250734 A1    Aug. 11, 2022

(51) Int. Cl.
*B64C 3/36*    (2006.01)
*B64C 3/20*    (2006.01)

(52) U.S. Cl.
CPC .   *B64C 3/36* (2013.01); *B64C 3/20* (2013.01)

(58) Field of Classification Search
CPC ................................. B64C 3/36; B64C 3/20
See application file for complete search history.

(56) References Cited

U.S. PATENT DOCUMENTS

| | | |
|---|---|---|
| 2,451,692 A | 10/1948 | Pugh |
| 3,064,317 A | 11/1962 | Dobson |
| 3,119,333 A | 1/1964 | Loughran |
| 3,151,712 A | 10/1964 | Jackson |
| 3,321,154 A | 5/1967 | Downs |
| 3,656,317 A | 4/1972 | Gray |
| 3,731,893 A | 5/1973 | Stalmach, Jr. |

(Continued)

FOREIGN PATENT DOCUMENTS

| | | |
|---|---|---|
| CN | 1201704 A | 12/1998 |
| CN | 104776740 A | 7/2015 |

(Continued)

OTHER PUBLICATIONS

Air pollution Control Technology Fact Sheet, Wet Electrostatic Precipitator (ESP), Wire-Pipe Type, EPA-452/F-03-029, Oct. 23, 2018, pp. 1-4. Retrieved from Internet URL: https://www3.epa.gov/ttnchiel/mkb/documents/fwespwpi.pdf.

(Continued)

*Primary Examiner* — Justin M Benedik
(74) *Attorney, Agent, or Firm* — Dority & Manning, P.A.

(57) ABSTRACT

A hypersonic aircraft includes one or more leading edge assemblies that are designed to manage thermal loads experienced at the leading edges during high speed or hypersonic operation. Specifically, the leading edge assemblies may include an outer wall tapered to a leading edge or stagnation point. The outer wall may define a vapor chamber and a capillary structure within the vapor chamber for circulating a working fluid in either liquid or vapor form to cool the leading edge. In addition, a dual-modal cooling structure can enhance heat transfer from the outer wall at the leading edge to the outer wall within the condenser section of the vapor chamber.

20 Claims, 3 Drawing Sheets

(56) References Cited

U.S. PATENT DOCUMENTS

| | | |
|---|---|---|
| 3,777,975 A | 12/1973 | Kofink |
| 3,785,591 A | 1/1974 | Stalmach, Jr. |
| 3,808,833 A | 5/1974 | Allen et al. |
| 3,883,096 A | 5/1975 | Osofsky |
| 3,908,936 A | 9/1975 | Durran |
| 4,014,485 A | 3/1977 | Kinnaird et al. |
| 4,203,489 A | 5/1980 | Swiadek |
| 4,344,591 A | 8/1982 | Jackson |
| 4,671,348 A | 6/1987 | Bauer |
| 4,700,773 A | 10/1987 | Kehrer |
| 4,771,365 A | 9/1988 | Chichocki et al. |
| 4,915,164 A | 4/1990 | Harper |
| 4,923,146 A | 5/1990 | Anthony |
| 4,924,228 A | 5/1990 | Novak et al. |
| 4,966,229 A | 10/1990 | Senterfitt et al. |
| 4,991,797 A | 2/1991 | Miller et al. |
| 5,149,018 A | 9/1992 | Clark |
| 5,174,524 A | 12/1992 | Amneus, III |
| 5,227,957 A | 7/1993 | Deters |
| 5,257,757 A * | 11/1993 | Paul ................... B64G 1/58 244/159.1 |
| 5,283,715 A | 2/1994 | Carlsten et al. |
| 5,291,830 A * | 3/1994 | Zwan ................... B64G 1/58 102/293 |
| 5,299,762 A * | 4/1994 | Kosson ................. B64G 1/58 244/130 |
| 5,330,124 A | 7/1994 | LeTouche |
| 5,343,632 A | 9/1994 | Dinh |
| 5,351,917 A * | 10/1994 | Bulman ................ B64G 1/58 244/159.1 |
| 5,439,351 A * | 8/1995 | Artt ................... F01D 5/185 415/114 |
| 5,452,866 A | 9/1995 | Bulman |
| 5,579,830 A | 12/1996 | Giammaruti |
| 5,647,429 A | 7/1997 | Oktay et al. |
| 5,690,473 A | 11/1997 | Kercher |
| 5,720,339 A | 2/1998 | Glass et al. |
| 5,761,909 A | 6/1998 | Hughes et al. |
| 5,899,265 A | 5/1999 | Schneider et al. |
| 5,975,841 A | 11/1999 | Lindemuth et al. |
| 6,164,061 A | 12/2000 | Chevalier et al. |
| 6,233,150 B1 | 5/2001 | Lin et al. |
| 6,260,613 B1 | 7/2001 | Pollard |
| 6,301,332 B1 | 10/2001 | Rogers et al. |
| 6,359,218 B1 | 3/2002 | Koch et al. |
| 6,360,813 B1 | 3/2002 | Katoh et al. |
| 6,367,740 B1 | 4/2002 | Johnson et al. |
| 6,375,425 B1 | 4/2002 | Lee et al. |
| 6,378,605 B1 | 4/2002 | Kutscher et al. |
| 6,392,883 B1 | 5/2002 | Ali |
| 6,430,931 B1 | 8/2002 | Homer |
| 6,478,257 B1 | 11/2002 | Oh et al. |
| 6,511,762 B1 | 1/2003 | Lee et al. |
| 6,599,568 B2 | 7/2003 | Lee et al. |
| 6,624,349 B1 | 9/2003 | Bass |
| 6,631,755 B1 | 10/2003 | Kung et al. |
| 6,678,159 B1 | 1/2004 | Barcley |
| 6,889,755 B2 | 5/2005 | Zuo et al. |
| 6,983,790 B2 | 1/2006 | Ippoushi et al. |
| 6,994,152 B2 | 2/2006 | Rosenfeld et al. |
| 7,002,247 B2 | 2/2006 | Mok et al. |
| 7,007,741 B2 | 3/2006 | Sen et al. |
| 7,032,654 B2 | 4/2006 | Wand et al. |
| 7,086,247 B2 | 8/2006 | Campbell et al. |
| 7,128,532 B2 | 10/2006 | Petervary et al. |
| 7,189,064 B2 | 3/2007 | Helder et al. |
| 7,232,093 B2 | 6/2007 | Behrens et al. |
| 7,256,992 B1 | 8/2007 | Stewart et al. |
| 7,281,688 B1 | 10/2007 | Cox et al. |
| 7,369,410 B2 | 5/2008 | Chen et al. |
| 7,377,098 B2 | 5/2008 | Walker et al. |
| 7,473,995 B2 | 1/2009 | Rumer et al. |
| 7,594,537 B2 | 9/2009 | Hou et al. |
| 7,686,248 B2 | 3/2010 | Weber et al. |
| 7,704,565 B2 | 4/2010 | Slaughter |
| 7,768,783 B1 | 8/2010 | Kajiya et al. |
| 7,859,844 B2 | 12/2010 | Nguyen et al. |
| 7,871,578 B2 | 1/2011 | Schmidt |
| 7,900,438 B2 | 3/2011 | Venkataramani et al. |
| 7,907,409 B2 | 3/2011 | Wyatt et al. |
| 7,928,562 B2 | 4/2011 | Arvelo et al. |
| 7,942,025 B1 | 5/2011 | Musone |
| 8,047,269 B2 | 11/2011 | Kang et al. |
| 8,109,324 B2 | 2/2012 | Farid et al. |
| 8,176,972 B2 | 5/2012 | Mok |
| 8,323,122 B2 | 12/2012 | Soracco et al. |
| 8,424,203 B2 | 4/2013 | dos Santos E Lucato |
| 8,464,535 B2 | 6/2013 | White et al. |
| 8,466,486 B2 | 6/2013 | Yuan |
| 8,475,112 B1 | 7/2013 | Ryznic et al. |
| 8,549,749 B2 | 10/2013 | Zimbeck et al. |
| 8,610,761 B2 | 12/2013 | Haisty et al. |
| 8,616,834 B2 | 12/2013 | Knight, III et al. |
| 8,656,722 B2 | 2/2014 | Norris et al. |
| 8,678,316 B2 | 3/2014 | Rawlings et al. |
| 8,684,310 B2 | 4/2014 | Rawlings et al. |
| 8,844,877 B1 | 9/2014 | Driemeyer et al. |
| 8,934,235 B2 | 1/2015 | Rubenstein et al. |
| 8,937,384 B2 | 1/2015 | Bao et al. |
| 8,960,601 B2 | 2/2015 | Willdig et al. |
| 9,193,457 B2 | 11/2015 | Janeke |
| 9,284,231 B2 | 3/2016 | Minnear et al. |
| 9,475,593 B2 | 10/2016 | Pinney et al. |
| 9,476,651 B2 | 10/2016 | Thiagrarajan et al. |
| 9,493,228 B2 | 11/2016 | Herzberg et al. |
| 9,516,791 B2 | 12/2016 | Chester et al. |
| 9,913,411 B2 | 3/2018 | De Bock et al. |
| D818,093 S | 5/2018 | Emo et al. |
| 9,974,157 B2 | 5/2018 | de Bock et al. |
| 10,173,780 B2 | 1/2019 | Mackin et al. |
| 10,209,009 B2 | 2/2019 | Gerstler et al. |
| 10,356,945 B2 | 7/2019 | Rush et al. |
| 10,386,127 B2 | 8/2019 | Rush et al. |
| 2002/0021556 A1 | 2/2002 | Dibene et al. |
| 2002/0144811 A1 | 10/2002 | Chou et al. |
| 2003/0043547 A1 | 3/2003 | Nealis et al. |
| 2004/0011503 A1 | 1/2004 | Kung et al. |
| 2004/0129032 A1 | 7/2004 | Severns et al. |
| 2005/0103473 A1 | 5/2005 | Todd et al. |
| 2005/0207120 A1 | 9/2005 | Tseng et al. |
| 2006/0060328 A1 | 3/2006 | Ewes et al. |
| 2006/0140346 A1 | 6/2006 | McCarthy |
| 2006/0145020 A1 * | 7/2006 | Buehler ............... B64G 1/58 244/171.8 |
| 2007/0012429 A1 | 1/2007 | Siu |
| 2007/0017659 A1 | 1/2007 | Brunschwiler et al. |
| 2007/0151708 A1 | 7/2007 | Touzov |
| 2007/0247813 A1 | 10/2007 | Colbert et al. |
| 2008/0149299 A1 | 6/2008 | Slaughter |
| 2008/0170368 A1 | 7/2008 | Chen et al. |
| 2008/0235977 A1 | 10/2008 | Kuwabara |
| 2009/0040726 A1 | 2/2009 | Hoffman et al. |
| 2009/0090109 A1 | 4/2009 | Mills et al. |
| 2009/0151900 A1 | 6/2009 | Huang |
| 2009/0244830 A1 | 10/2009 | Wyatt et al. |
| 2010/0051227 A1 | 3/2010 | Anbudurai |
| 2010/0065256 A1 | 3/2010 | Wilcoxon et al. |
| 2010/0109137 A1 | 5/2010 | Sasaki et al. |
| 2010/0170101 A1 | 7/2010 | Taniguchi et al. |
| 2010/0200199 A1 | 8/2010 | Habib et al. |
| 2010/0212656 A1 | 8/2010 | Qiu et al. |
| 2010/0320187 A1 | 12/2010 | Griffin et al. |
| 2011/0016886 A1 | 1/2011 | Ghoshal et al. |
| 2011/0168159 A1 | 7/2011 | Lataperez et al. |
| 2011/0209864 A1 | 9/2011 | Figus et al. |
| 2011/0232877 A1 | 9/2011 | Meyer, IV et al. |
| 2011/0253344 A1 | 10/2011 | Kuhn et al. |
| 2011/0259041 A1 | 10/2011 | Kuehl et al. |
| 2011/0279969 A1 | 11/2011 | Memon |
| 2011/0279970 A1 | 11/2011 | Guan |
| 2012/0107662 A1 | 5/2012 | Roemmler et al. |
| 2012/0110869 A1 | 5/2012 | Bellinger et al. |
| 2012/0125573 A1 | 5/2012 | Rubenstein et al. |

(56) References Cited

U.S. PATENT DOCUMENTS

| | | |
|---|---|---|
| 2012/0155015 A1 | 6/2012 | Govindasamy et al. |
| 2012/0192574 A1 | 8/2012 | Ghoshal et al. |
| 2012/0206880 A1 | 8/2012 | Andres et al. |
| 2012/0227926 A1 | 9/2012 | Field et al. |
| 2012/0250259 A1 | 10/2012 | Lee et al. |
| 2012/0319410 A1 | 12/2012 | Ambrosek et al. |
| 2012/0331269 A1 | 12/2012 | Aras |
| 2013/0003307 A1 | 1/2013 | Jang |
| 2013/0008632 A1 | 1/2013 | Brunschwiler et al. |
| 2013/0056170 A1 | 3/2013 | Klemencic |
| 2013/0077245 A1 | 3/2013 | Gradinger et al. |
| 2013/0079693 A1 | 3/2013 | Ranky et al. |
| 2013/0098417 A1 | 4/2013 | Gavillet |
| 2013/0105122 A1 | 5/2013 | Campbell et al. |
| 2013/0107455 A1 | 5/2013 | Cottet et al. |
| 2013/0170142 A1 | 7/2013 | Weaver, Jr. et al. |
| 2013/0189594 A1 | 7/2013 | Breit et al. |
| 2013/0206374 A1 | 8/2013 | Rosin et al. |
| 2014/0014493 A1 | 1/2014 | Ryan |
| 2014/0037873 A1 | 2/2014 | Cheung et al. |
| 2014/0060771 A1 | 3/2014 | Bell et al. |
| 2014/0083653 A1 | 3/2014 | Kempers et al. |
| 2014/0090808 A1 | 4/2014 | Bessho et al. |
| 2014/0102662 A1 | 4/2014 | Grama et al. |
| 2014/0104787 A1 | 4/2014 | Chainer et al. |
| 2014/0150464 A1 | 6/2014 | Bloedow et al. |
| 2014/0154539 A1 | 6/2014 | Kwok et al. |
| 2014/0158334 A1 | 6/2014 | Dellea et al. |
| 2014/0163445 A1 | 6/2014 | Pallari et al. |
| 2014/0174086 A1 | 6/2014 | Kare et al. |
| 2014/0190667 A1 | 7/2014 | McGlen et al. |
| 2014/0233174 A1 | 8/2014 | Demange |
| 2014/0251585 A1 | 9/2014 | Kusuda et al. |
| 2014/0268831 A1 | 9/2014 | Shih et al. |
| 2014/0268969 A1 | 9/2014 | Crouch et al. |
| 2014/0284020 A1 | 9/2014 | Amir et al. |
| 2014/0321998 A1 | 10/2014 | Maar et al. |
| 2014/0334104 A1 | 11/2014 | Yang et al. |
| 2014/0340845 A1 | 11/2014 | Straznicky et al. |
| 2014/0362590 A1 | 12/2014 | Chen et al. |
| 2014/0368992 A1 | 12/2014 | Strader et al. |
| 2015/0000871 A1 | 1/2015 | Farmer et al. |
| 2015/0027669 A1 | 1/2015 | Kokas et al. |
| 2015/0040888 A1 | 2/2015 | Zakhidov et al. |
| 2015/0080495 A1 | 3/2015 | Heikkila |
| 2015/0237762 A1 | 8/2015 | Holt et al. |
| 2015/0289413 A1 | 10/2015 | Rush et al. |
| 2015/0315971 A1 | 11/2015 | Reitz et al. |
| 2015/0366105 A1 | 12/2015 | Dunwoody et al. |
| 2016/0116218 A1 | 4/2016 | Shedd et al. |
| 2016/0124474 A1 | 5/2016 | So et al. |
| 2016/0202003 A1 | 7/2016 | Gerstler et al. |
| 2016/0305279 A1 | 10/2016 | Gerstler et al. |
| 2016/0319135 A1 | 11/2016 | Hecht |
| 2017/0064868 A1 | 3/2017 | Rush et al. |
| 2017/0067693 A1 | 3/2017 | Rush et al. |
| 2017/0167838 A1 | 6/2017 | Quertelet |
| 2017/0276440 A1 | 9/2017 | Kenworthy et al. |
| 2017/0363363 A1 | 12/2017 | Lassini et al. |
| 2018/0022439 A1 | 1/2018 | Stanley et al. |
| 2018/0057191 A1 | 3/2018 | Zhang et al. |
| 2018/0356794 A1 | 12/2018 | Wiedenhoefer et al. |
| 2020/0103947 A1 | 4/2020 | Rush et al. |

FOREIGN PATENT DOCUMENTS

| | | |
|---|---|---|
| CN | 104859835 | 8/2015 |
| DE | 2837802 A1 | 8/1979 |
| DE | 102011086786 B3 | 3/2013 |
| EP | 1054583 A2 | 11/2000 |
| GB | 849212 A | 9/1960 |
| GB | 2476253 A | 6/2011 |
| JP | 9-4962 | 1/1997 |
| TW | I289655 B | 11/2007 |
| WO | WO2013/097031 A2 | 7/2013 |
| WO | WO2016/057471 A1 | 4/2016 |

OTHER PUBLICATIONS

Ameli et al., A Novel Method for Manufacturing Sintered Aluminum Heat Pipes (SAHP), Applied Thermal Engineering, vol. 52, Issue 2, Apr. 15, 2013, pp. 498-504.

Arif-Uz-Zaman et al., A Novel Dehumidification Technique Using Electric Field, IEEE Transactions on Industry Applications, vol. 32, Issue 1, Jan./Feb. 1996, pp. 36-40.

Battery Prognostics—Prognosis Framework, National Aeronautics and Space Administration, May 8, 2014, pp. 1-3. Retrieved from Internet URL: https://ti.arc.nasa.gov/tech/dash/groups/pcoe/battery-prognostics/prognosis-framework/.

Bendt, Are We Missing Energy Savings in Clothes Dryers?, ACEEE Summer Study on Energy Efficiency in Buildings, 2010, pp. 9-42 to 9-55.

Brackett et al., Topology Optimization for Additive Manufacturing, Wolfson School of Mechanical and Manufacturing Engineering, Loughborough University, Aug. 17, 2011, Loughborough, Leicestershire, LE11 3TU, UK, pp. 348-362.

Brotan et al., The hybrid manufacturing cell: Determining key parameters in the integration of powder bed fusion with high speed milling, Industrial Engineering and Engineering Management (IEEM), 2012 IEEE International Conference on Dec. 10-13, 2012, Hong Kong, pp. 583-587.

Brown et al., Thermal management issues and evaluation of a novel, flexible substrate, 3-dimensional (3-D) packaging concept, Multichip Modules and High Density Packaging, 1998 International Conference Apr. 15-17, 1998, Denver, CO, pp. 135-140.

Buckley et al., Application of Wet Electrostatic Precipitation Technology in the Utility Industry for Multiple Pollutant Control Including Mercury, Croll-Reynolds Clean Air Technologies, 2003, pp. 1-14.

Buekens, Electrostatic Precipitators, Pollution Control Technologies, Encyclopedia of Life Support Systems (EOLSS), vol. 1, 2008, pp. 1-9.

Building Energy Efficiency Frontiers and Incubator Technologies Benefit—2014, Funding Opportunity Announcement (FOA) No. DE-FOA-0001027, 2014, pp. 1-94.

Dukhan et al., An improved PCM Heat Storage Technology Utilizing Metal Foam, 2010 $12^{th}$ IEEE Intersociety Conference on Thermal and Thermomechanical Phenomena in Electronic Systems, (ITherm), Las Vegas, NV, Jun. 2-5, 2010, pp. 1-7.

Energy Star, Emerging Technology Award Requirements: Advanced Dryers, Feb. 9, 2012, p. 1. Retrieved from Internet URL: https://www.energystar.gov/sites/default/files/asset/document/2012_ENERGY_STAR_Emerging_Technology_Award_Advanced_Clothes_Dryers_Requirements.pdf.

Energy Star, Residential Clothes Dryers, Energy Star Market & Industry Scoping Report: Dryers, Nov. 2011, pp. 1-18.

Goswami et al., Analysis of Thermal Energy Storage in Cylindrical PCM Capsules Embedded in a Metal Matrix, Energy Conversion Engineering Conference 1990, IECEC-90 Proceedings of the $25^{th}$ Inersociety, vol. 4, Aug. 12-17, 1990, pp. 257-262.

Green et al., Dynamic Thermal management of high heat flux devices using embedded solid-liquid phase change materials and solid state coolers, Thermal and Thermomechanical Phenomena in Electronic Systems, 13th IEEE Intersociety Conference on May 30, 2012-Jun. 1, 2012, pp. 853-862.

Gulli et al., Variable Transpiration Cooling for the Thermal Management of Reusable Hypersonic Vehicles, Aerospace Science and Technology, Elsevier, vol. 29, 2013, pp. 434-444.

Gurijanov, Ajax: New Directions in Hypersonic Technology, American Institute of Aeronautics and Astronautics, Inc., AIAA Paper 96/4609, 1996, pp. 9.

Hara et al., Optimization for Chip Stack in 3-D Packaging, Advanced Packaging, IEEE Transactions on, vol. 28, Issue 3, Aug. 2005, pp. 367-376.

(56) References Cited

OTHER PUBLICATIONS

Lee, Ventless Drying—the New Standard of Efficiency, Jul. 30, 2010, pp. 1-2.

Miles et al., Plasma-Enhanced Hypersonic Performance Enabled by MHD Power Extraction, AIAA 2005-0561, 43$^{rd}$ AIAA Aerospace Sciences Meeting and Exhibit, Reno Nevada, Jan. 10-13, 2005, 16 Pages.

Mochizuki et al., A Review of Heat Pipe Application Including New Opportunities, Frontiers in Heat Pipes, Global Digital Central, vol. 2, 013001, 2011, 15 pages.

Pingsheng et al., Effect of Charge on Growth of Droplets with Ionic Condensation Nuclei, Chinese Science Bulletin, vol. 56, No. 18, Jun. 2011, pp. 1942-1946.

Radiant Heating With Infrared—a Technical Guide to Understanding and Applying Infrared Heaters, Watlow Electric Manufacturing Company, 1997, pp. 1-39.

Rawal et al., Thermal management for multifunctional structures, Advanced Packaging, IEEE Transactions, vol. 22, Issue: 3, Denver, CO, Aug. 1999, pp. 379-383.

Reznikov et al., Corona discharge in the steam for electrostatically enforced condensation, Proceedings 2012 Electrostatics Joint Conference, Jun. 2012, pp. 1-4.

Reznikov et al., Electrohydrodynamic Enforcement of Evaporation and Gas Flow, IEEE Transactions on Industry Applications, vol. 47, No. 2, Mar./Apr. 2011, pp. 1036-1042.

Robak, Latent Heat Thermal Energy Storage with Embedded Heat Pipes for Concentrating Solar Power Applications, University of Connecticut Master's Theses, Paper 229. Obtained from: https://opencommons.uconn.edu/us_theses/229/.

Salazar et al., Electrospray as an Enforcement of Steam Condensation, Proc. ESA Annual Meeting on Electrostatics, 2013, pp. 1-10.

Sharfi, Engineers guide to military aerospace and avionics, an Interview with General Micro Systems' CEO Ben Sharfi, Extension Media, Application Solutions, 2014, 44 Pages.

Subracks, Enclosure Frames, Pixux Technologies.

Tapuchi et al., Obtaining Fresh Water from Atmosphere using Electrostatic Precipitation: Theory, Efficiency and Limitations, E-Water, Official Publication of the European Water Association (EWA), 2010, pp. 1-6.

Vanwie et al., Hypersonic Airbreathing Propulsion, John Hopkins APL Technical Digest, vol. 26, No. 4, 2005, pp. 430-437.

Wang et al., Numerical Investigation on the Optimization of Local Transpiration Cooling Effectiveness, Applied Thermal Engineering, ScienceDirect, vol. 127, 2017, pp. 58-69.

Wu et al., Investigation of the Polymer Wick Structure Applied to Loop Heat Pipe, 2009 4th International Microsystems, Packaging, Assembly and Circuits Technology Conference, Oct. 2123, 2009, pp. 368-371.

Yang, Corona-Driven Air Propulsion for Cooling of Microelectronics, Master of Science in Electrical Engineering, 2002, pp. 1-81.

Yogev et al., PCM Storage System with Integrated Active Heat Pipe, Energy Procedia, Proceedings of the Solar PACES 2013 International Conference, ScienceDirect, vol. 49, 2014, pp. 1061-1070.

Zukowski, Experimental Study of Short Term Thermal Energy Storage Unit Based on Enclosed Phase Change Material in Polyethylene Film Bag, Energy Conversion and Management, vol. 48, Issue 1, Jan. 2007, pp. 166-173.

\* cited by examiner

SYSTEM AND METHOD FOR COOLING A LEADING EDGE OF A HIGH SPEED VEHICLE

FIELD

The present subject matter relates generally to leading edge technologies for use in high speed vehicles, such as hypersonic aircraft.

BACKGROUND

High speed vehicles often experience thermal management issues resulting from high heat load experienced during high speed operation, particularly at leading edges where the free air stream impinges on the vehicle. For example, in an application involving hypersonic aircrafts, the leading edges can include the nose, engine cowls, and the leading edges of wings and stabilizers. Particularly when these vehicles are operating in the hypersonic speed range (e.g., Mach 5 or greater), the leading edges may be subjected to very high heat load (e.g., 500-1500 W/cm$^2$) as the incident airflow passes through a bow shock and comes to rest at the vehicle surface, converting the kinetic energy of the gas to internal energy and greatly increasing its temperature. Unmitigated exposure to such thermal loading can result in component degradation and/or failure.

Improvements in materials and manufacturing techniques have enabled hypersonic aircraft to operate at higher speeds and temperatures. Additional advancements in vehicle speed and duration of high speed flight times can be achieved through improvement in the cooling ability and high temperature durability of the leading edges of high speed vehicles. Transpiration cooling involves passage of fluid to an ambient environment surrounding the leading edge to undergo transpiration. This technique requires an expendable cooling fluid. The cooling fluid, in addition to supporting hardware (e.g., storage tanks, piping, etc), adds weight to and consumes volume on the vehicle. Advancement in the art requires mitigation of these negative consequences associated with transpirational cooling.

Accordingly, improvements to hypersonic aircraft and propulsion technologies would be useful. More specifically, improvements in leading edge technologies and methods of cooling leading edges or hypersonic vehicles would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a leading edge assembly for a hypersonic vehicle, the leading edge assembly comprising: an outer wall tapering to a leading edge, the outer wall comprising a porous section, the porous section comprising a first porous region and a second porous region; a coolant supply structure defining a first supply flowpath extending to the first porous region and a second supply flowpath extending from the first supply flowpath at a location upstream of the first porous region to the second porous region; and a coolant supply for providing a flow of a coolant through the coolant supply structure and through the porous section to cool the outer wall.

According to another exemplary embodiment, a leading edge assembly for a hypersonic vehicle, the leading edge assembly comprising: an outer wall tapering to a leading edge, the outer wall comprising a porous section, the porous section comprising a first porous region disposed at a stagnation point of the leading edge and a second porous region disposed adjacent to the first porous region and spaced apart therefrom by a barrier; a coolant supply structure configured to distribute a coolant from a coolant supply to the porous section, wherein an internal pressure, $P_1$, of the coolant in the first porous region is higher than an internal pressure, $P_2$, of the coolant in the second porous region.

According to another exemplary embodiment, A method of cooling a leading edge assembly for a hypersonic vehicle, the method comprising: pressurizing a coolant within a coolant supply structure of the leading edge assembly in a direction toward a porous section of the leading edge assembly at a first internal pressure, $P_1$; and adjusting the first internal pressure, $P_1$, in response to a changed condition sensed by the leading edge assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, aspects of the present subject matter are directed to leading edge assemblies for high speed aircraft or vehicles, such as hypersonic aircraft. As used herein, the term "hypersonic" refers generally to air speeds above Mach 5. However, it should be appreciated that aspects of the present subject matter are not limited only to hypersonic flight, but may instead apply to applications involving other high speed vehicles, projectiles, objects, etc. with flight Mach numbers of less than 5. The description of leading edge assemblies herein with respect to use on a hypersonic aircraft are only examples intended to facilitate the explanation of aspects of the present subject matter. The present subject matter is not limited to such exemplary embodiments and applications. In fact, in embodiments described herein, it is possible for the same aircraft to fly at hypersonic, supersonic, and/or subsonic speeds.

Figure 1:
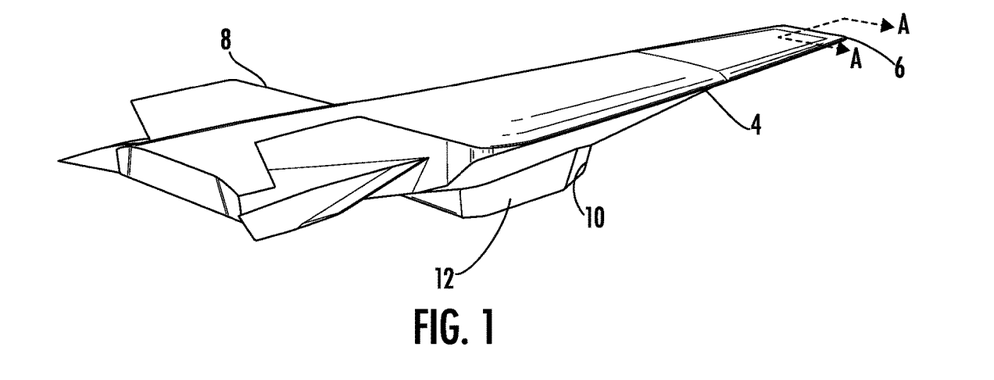
FIG. 1 is a perspective view of a hypersonic vehicle in accordance with an exemplary embodiment of the present disclosure.

Referring to FIG. 1, high speed vehicles, such as a hypersonic aircraft 2, typically experience extremely high temperatures and thermal gradients during high speed or hypersonic operation. The temperature gradients that are caused by the high heat flux are often a more severe problem than the temperature itself. For example, the thermal conductivity of the structural material, in combination with the heat flux, sets the temperature gradient within the material, and at high heat loads this gradient leads to mechanical stresses that cause plastic deformation or fracture of the material. The heat load to the structural material should be reduced to maintain the structural integrity of the components.

As will be appreciated, the leading edges of such high speed vehicles often experience the highest thermal loading. For example, a hypersonic vehicle may include a plurality of leading edge assemblies (e.g., identified generally herein by reference numeral 100) which experience high thermal loads during hypersonic flight. In this regard, leading edge assemblies 100 may be provided on a forward end of the aircraft wings 4, the nose cone 6, the vertical stabilizer 8, the engine cowls 10 of the propulsion engines 12, or other leading edges or surfaces of the hypersonic aircraft 2. According to exemplary embodiments of the present subject matter, leading edge assemblies 100 include features for mitigating the effects of such thermal loading, e.g., by carrying heat out of the region.

Notably, it is typically desirable to make leading edge assemblies 100 as sharp or pointed as possible, e.g., in order to reduce drag on the hypersonic vehicle. However, referring now to FIG. 1, when leading edge assemblies 100 are formed into a sharp point, extremely high temperatures and thermal gradients are experienced within leading edge assembly 100 at its forward or leading edge, also referred to herein as a stagnation line, a stagnation point 102, or similar terms. In this regard, as a hypersonic vehicle is traveling through air at hypersonic speeds, a free stream flow of air (e.g., identified herein by reference numeral 104) passes over and around leading edge assembly 100, thereby generating large thermal loads. Aspects of the present subject matter are directed to thermal management technologies and features for cooling leading edge assemblies 100, with a particular focus on the regions close to stagnation point 102, where the most serious thermal management issues typically arise.

It should be appreciated that the leading edge assemblies 100 illustrated herein are simplified cross section illustrations of exemplary leading edges described above. The size, configuration, geometry, and application of such leading edge technologies may vary while remaining within the scope of the present subject matter. For example, the leading edge assemblies 100 described herein define a radius of between about 1 mm and 3 mm. However, according to alternative embodiments, leading edge assemblies could have any other suitable diameter.

The cooling technologies and thermal management features are described herein as being used to cool portions of one or more parts of a hypersonic aircraft, such as the leading edges of the wings, nose, propulsion engines, or other parts of the hypersonic aircraft that experience large temperature gradients. However, it should be appreciated that aspects of the present subject matter may be used to manage thermal loading such as high temperatures and thermal gradients within any component and in any suitable application. In this regard, for example, aspects of the present subject matter may apply to any other hypersonic vehicle or to any other technology or system having components that are exposed to high temperatures and/or large temperature gradients.

In addition, although various techniques, component configurations, and systems are described herein for cooling leading edge assemblies 100 of a hypersonic vehicle, it should be appreciated that variations and modifications may be made to such technologies without departing from the scope of the present subject matter. In addition, one or more such technologies may be used in combination with each other to achieve improved cooling and thermal management. In this regard, although each cooling technology is described in isolation in order to clearly describe how each technology functions, the embodiments described are only examples intended for the purpose of illustration and explanation, and are not intended to limit the scope of the present subject matter in any manner.

In addition, according to exemplary embodiments of the present subject matter, some or all components described herein may be formed using an additive-manufacturing process, such as a 3-D printing process. The use of such a process may allow certain components of a hypersonic vehicle, such as leading edge assemblies 100, to be formed integrally, as a single monolithic component, or as any suitable number of sub-components. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be metal, concrete, ceramic, epoxy, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Figure 2:
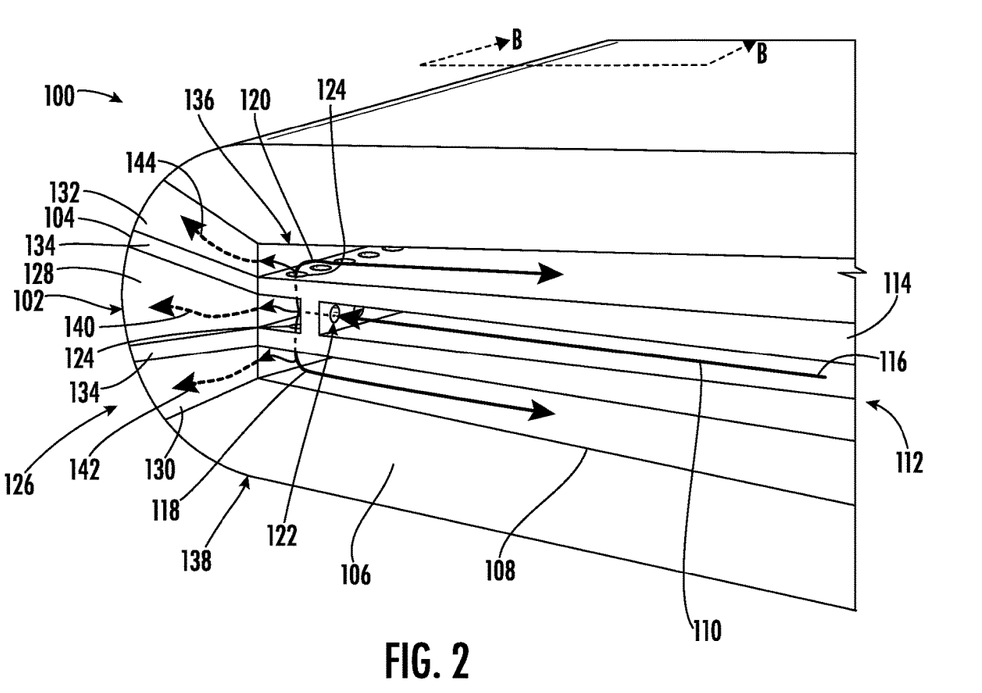
FIG. 2 is a close-up, cross-sectional, schematic view of a leading edge of a hypersonic vehicle in accordance with an exemplary embodiment of the present disclosure, as seen along Line A-A in FIG. 1.

Referring to FIG. 2, leading edge assembly 100 will be described in more detail according to an exemplary embodiment of the present subject matter. Specifically, FIG. 2 provides a cross-sectional view of a leading edge assembly 100 of the nose cone 6 as seen along Line A-A in FIG. 1. However, it should be understood that the leading edge assembly 100 may be positioned at a leading edge (e.g., a forward end, a leading end, upstream end, etc.) of any component of a hypersonic aircraft. For example, leading edge assembly 100 may be, e.g., a leading edge of an inlet duct to a hypersonic propulsion engine, a leading edge of a turbine engine, a leading edge of a wing(let) of the aircraft, a forward end of a vertical stabilizer, etc.

As explained herein, large thermal loads may be experienced by leading edge assemblies 100 during hypersonic flight operations. As used herein, the terms "thermal load" and the like are intended generally to refer to the high temperatures, temperature gradients, or heat flux experienced within a component of a hypersonic or high-speed vehicle. According to exemplary embodiments of the present subject matter, leading edge assemblies 100 are formed or provided with thermal regulation features or technologies for managing these thermal loads.

For example, as described in more detail below with reference to FIG. 2, leading edge assembly 100 may include one or more features for providing or distributing a material within the leading edge assembly 100 to move thermal energy from relatively hot location, e.g., proximate stagnation point 102, to relatively cold regions downstream of stagnation point. In this manner, the temperature gradient experienced within leading edge assembly 100 may be reduced. It should be appreciated that the thermal regulation features and technologies described herein for each exemplary leading edge assembly 100 may be used alone or in combination with any other leading edge technologies described herein to regulate the thermal loading on one or more leading edge assemblies 100 of a hypersonic vehicle, or any other surface of any other component that experiences high thermal loading.

The stagnation point 102 may define a forward end 104 of the leading edge assembly 100. For example, the stagnation point 102 may define the leading edge of the wing 4 depicted in FIG. 1. The leading edge assembly 100 can include an outer wall 106. As explained above, outer wall 106 and other components of leading edge assembly 100 may be formed from any suitable material. According to an exemplary embodiment, such materials are selected to withstand the high thermal loading experienced by the leading edges of a hypersonic aircraft. For example, outer wall 106 may be constructed from at least one of aluminum, titanium, titanium aluminide, tungsten, tungsten alloy, nickel superalloy, refractory material, refractory high entropy alloy, single-crystal metal, ceramic, ceramic matrix composite (CMC), or carbon-carbon composite. Nevertheless, it may still be desirable in certain applications to provide additional cooling capacity for thermal management of the high heat loads experienced by leading edge assembly 100. Moreover, as explained above, the additive manufacturing technologies may be used to print leading edge assembly 100 (e.g. including outer wall 108) as a single monolithic component, and may facilitate improved cooling technologies and leading edge features. Leading edge assembly 100 may also be formed from sintering in a high temperature furnace or spark plasma sintering.

As is shown in the embodiment depicted, the outer wall 106 is generally formed from a continuous wall section. In other embodiments, the outer wall 106 can be formed from a first wall section and a second wall section that meet or join, for example, at the stagnation point 102. The surfaces of the outer wall 106 may be angled relative to each other such that leading edge assembly 100 is tapered from an aft end of leading edge assembly 100 to the forward end 104 of leading edge assembly 100 (e.g., which corresponds to stagnation point 102). In other words, leading edge assembly 100 is wider or taller proximate aft end of leading edge assembly 100 and narrows as it approaches stagnation point 102. Notably, the taper angle may vary depending on aerodynamic and other considerations while remaining within the scope of the present subject matter.

An inner volume 108 of the leading edge assembly 100, as defined by the outer wall 106, can be configured to transmit coolant along a flowpath 110 from a coolant supply 300 (FIG. 3) to the forward end 104 of the leading edge assembly 100 to cool the leading edge assembly 100. The flowpath 110 can generally pass through a coolant supply structure 112 of the leading edge assembly 100. A sidewall 114 of the coolant supply structure 112 can split the flowpath 110 into a first supply flowpath 116 and a second supply flowpath 118. The sidewall 112 can further split the flowpath 110 into a third supply flowpath 120.

As illustrated, the first supply flowpath 116 can pass through one or more impingement devices 122 configured to control fluid flow of the first supply flowpath 116. By way of example, the impingement device(s) 122 can include restrictions, baffles, holes, pores and other microstructure, riffles, or other types of fluid metering controls configured to control the pressure of coolant in the first supply flowpath 116.

The first supply flowpath 116 can diverge into the second supply flowpath 118 downstream of at least one of the one or more impingement device(s) 122. The second supply flowpath 118, for example, can branch off of the first supply flowpath 116. In an embodiment, the third supply flowpath 120 may branch off of the first supply flowpath 116 from the opposite side as compared to the second supply flowpath 118. In certain instances, the flowpaths 118 and 120 can be reflectively symmetrical, or generally reflectively symmetrical, with one another.

The coolant can pass through one or more metering devices 124 of the coolant supply structure 112 between the first supply flowpath 116 and the second and/or third supply flowpaths 118 and 120. That is, the coolant can pass through an element configured to control fluid flow from the first supply flowpath 116 to at least one of the second and third flowpaths 118 and 120. By way of example, at least one of the one or more metering devices 124 can include a restriction, a baffle, a hole, a pore or other microstructure, a riffle, or another type of fluid metering control configured to control the pressure of coolant in at least one of the first supply flowpath 116, the second supply flowpath 118, and the third supply flowpath 120. In some instances, at least one of the metering devices 124 and at least one of the impingement devices 122 can be a same type of fluid metering control system. In a more particular embodiment, all of the impingement devices 122 and metering devices 124 can be the same type of fluid metering control system. In yet a more particular embodiment, all of the impingement devices 122 and metering devices 124 can have the same relative size and/or shape relative to one another. In other yet more particular embodiments, at least one of the impingement devices 122 and at least one of the metering devices 124 can have different relative size and/or shapes relative to one another. In other instances, none of the impingement devices 122 and metering devices 124 are the same type of fluid metering control system.

The use of impingement devices 122 and/or metering device 124 can control pressure of the coolant within the leading edge assembly 100. For instance, use of an impingement device 122 with a large opening size and a metering device with a small opening size can increase the pressure in one area of the leading edge assembly while decreasing the pressure in another area. Conversely, large opening size in the metering device 124 can increase the pressure in the other area. Selection of impingement and metering device size can affect the relative pressurization within the leading edge assembly 100.

In certain instances, at least one of the impingement device 122 and metering device 124 can have variable pressure capability. That is, the relative difficulty of coolant to pass therethrough can be adjustable within a range of available options. By way of example, the metering device 124 can include an opening having an adjustable size, e.g., a valve, that can be selectively opened and closed. In such a manner, the restrictive characteristics of the metering device 124 can be controlled. In certain instances, control of the variable metering device 124 can occur using one or more processors in electronic communication with the variable metering device 124. As increased or decreased pressure is warranted, the processor can communicate with the metering device 124 to affect the pressure change by adjusting the restriction of the metering device 124. By way of non-limiting example, the processor can receive information associated with an external pressure outside the vehicle and adjust the metering device 124 accordingly. In certain instances, the processor can receive the information associated with the external pressure on an ongoing basis and adjust the metering device 124 accordingly in response to changes in the external pressure, e.g., as a result of changing speeds, changing angles of attack, and the like. Similarly, the processor can communicate with the impingement device 122 to affect relative pressure characteristics therethrough.

It should be understood that in accordance with certain embodiments, the leading edge assembly 100 may not include either one or both of the impingement device 122 and metering device 124. That is, for example, the first supply flowpath 116 can communicate with the second supply flowpath and the third supply flowpath without intervening control mechanisms like the impingement device 122 and metering device 124.

At the forward end 104 of the leading edge assembly 100, the outer wall 106 can define a porous section 126. The porous section 126 can include a plurality of porous regions, including, for example, a first porous region 128, a second porous region 130, and a third porous region 132. The first porous region 128 can be disposed between the second porous region 130 and the third porous region 132. In certain instances, the first porous region 128 can define the stagnation point 102. That is, the stagnation point 102 can be located along the first porous region 128. The second porous region 130 and third porous region 132 may be offset from the first porous region 128 by barriers 134.

According to an exemplary embodiment, the porous section 126 may define a constant permeability for passing coolant. As used herein, the term "permeability" may be used generally to refer to a measure of the void or empty spaces within a material or structure. Thus, a structure having permeability has open passages, cells, or structures through which fluid may flow from one porous cell to another. For example, permeability may be used to refer to a fraction of the volume of voids or open space over a total volume of a component. According to exemplary embodiments, the permeability of the porous section 126 may be greater than about 5%, 10%, 20%, 40% or greater than even 50%. In addition, or alternatively, the permeability of porous section 126 may be less than about 80% 60%, 40%, 20%, or 5%. It should be appreciated that the permeability of porous section 126 may vary depending on the application while remaining within scope of the present subject matter. For example, the permeability may vary based on the mass flow rate of the coolant, the mechanical properties of porous section 126, based on anticipated flight conditions, or based on any other suitable parameters.

Notably, according to the illustrated embodiment, porous section 126 may define a variable permeability, e.g., in order to concentrate the coolant proximate the stagnation point 102. More specifically, a first permeability of first porous region 128 can be different than a second permeability of second porous region 130. More specifically, according to an exemplary embodiment, the first permeability can be greater than the second permeability. Similarly, the third permeability may be the same as or different and the second permeability, but is also less than the first permeability. For example, according to an exemplary embodiment, the first permeability may be at least about 10 percent greater than the second and third permeability, such as at least about 25 percent greater, such as at least about 50 percent greater, such as at least about 100 percent greater, and up to about 1000 percent greater permeability than the second and third permeability.

The coolant contained in the inner volume 108 can be in fluid communication with the porous section 126. The coolant can be selectively provided through the porous section 126 to an external environment. Such transpiration may enhance cooling at the leading edge of the leading edge assembly 100. The amount of coolant that flows through first porous region 128 may be greater than the amount of coolant flowing through one or both of second porous region 130 and third porous region 132. Notably, the ratio or amount of coolant flowing through each region of porous section 126 may be adjusted by manipulating the permeabilities within each region 128, 130, and 132. According to the illustrated embodiment, it is desirable to have the highest permeability in first porous region 128 to direct the largest amount of coolant toward the most heat affected region, i.e., stagnation point 102. In addition, higher permeability at the stagnation point 102 may help compensate for the fact that the pressure is highest at this point, which decreases the amount of coolant that naturally flows toward stagnation point 102.

Notably, porous section 126 is illustrated as having three distinct porous regions 128, 130, and 132. However, it should be appreciated that using the additive manufacturing techniques described herein, porous section 126 may have a progressively varying permeability, i.e., such that the permeability continuously and progressively increases from forward end 104 of outer wall 106 to the highest permeability at stagnation point 102. In this manner, porous section 126 may be envisioned as having 10, 20, 50, 100, or even more subregions, each of which has a progressively increasing permeability as they approach stagnation point 102. As illustrated, each of these subregions extends from an inner surface 136 of the outer wall 106 to an outer surface 138.

Figure 3:
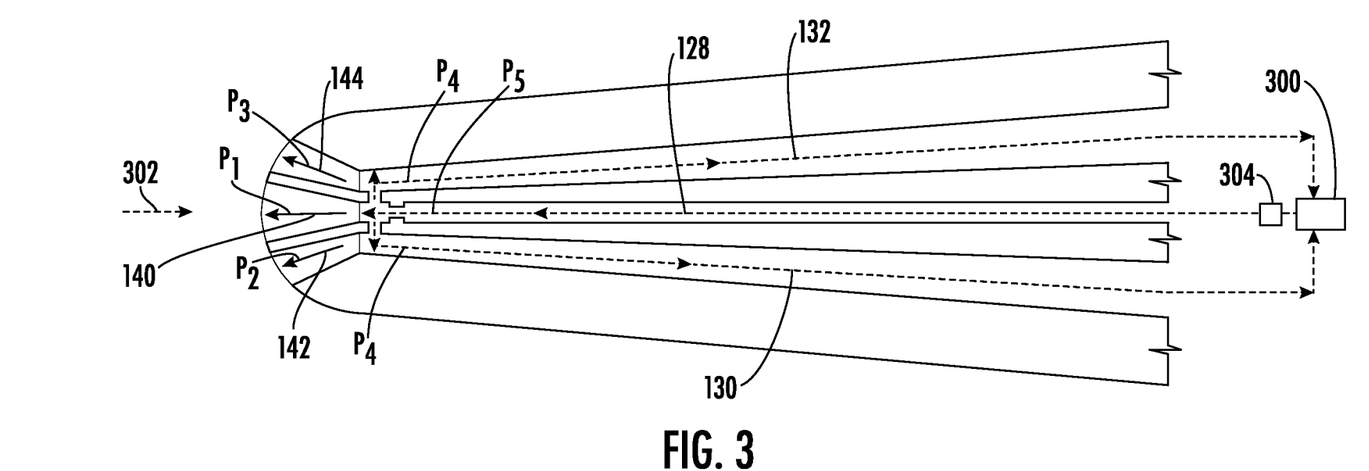
FIG. 3 is a close-up, cross-sectional, perspective view of a leading edge of a hypersonic vehicle in accordance with an exemplary embodiment of the present disclosure, as seen along Line B-B in FIG. 2.

In an embodiment, the first porous region 128 can define a first cross-sectional area, as seen along a plane intersecting the leading edge (e.g., as depicted in FIGS. 2 and 3), that is larger than a second cross-sectional area of the second porous region 130, as seen along the plane intersecting the leading edge. In another embodiment, the first cross-sectional area can also be larger than a third cross-sectional area of the third porous region 132, as seen along the plane intersecting the leading edge. In certain instances, the second and third cross-sectional areas can be approximately equal to one another. In other instances, the second and third cross-sectional areas can be different from each other.

According to exemplary embodiments, porous section 126 may include additional features for directing the flow of coolant to the desired locations within leading edge assembly 100. For example, the porous section 126 may include one or more barriers 134 that separate one or more of porous regions 128, 130, and 132. In this regard, as illustrated, barriers 134 are straight and solid walls that extend from inner surface 136 to outer surface 138. However, in some embodiments, the barriers 134 can extend less than a complete distance between the inner surface 136 and the outer surface 138. The barriers 134 may be part of the sidewall 114 of the coolant supply structure 112. Other configurations are possible and within the scope of the present subject matter.

In the illustrated embodiment, coolant passing through the impingement device 122 can further enter the first porous region 128 and travel therethrough to the stagnation point 102 along flowpath 140. Coolant passing through the metering devices 124 can enter the second and third porous regions 130 and 132 and travel therethrough to the outer surface 138 of the outer wall 106 along flowpaths 142 and 144, respectively. Coolant passing along flowpaths 140, 142, and 144 can pass to the outer surface 138 to perform transpiration-based cooling.

FIG. 3 is a simplified, cross-sectional view of the leading edge assembly 100 as seen along Line B-B in FIG. 2. Notably, the plane of intersection as shown in FIG. 3 is taken across a centerline of the impingement device 122 and metering device 124. It should be understood that planar alignment between the impingement device 122 and metering device 124 as shown in FIG. 3 is not required, and is illustrated merely as an exemplary embodiment.

Air 302, such as hot gas, applies pressure along the coolant at the forward end 104 of the leading edge assembly 100. In such a manner, the air 302 creates a pressure generally opposite the internal pressure of the porous section 126. The pressure of the air 302 may be greatest at the stagnation point 102, or immediately adjacent thereto. Accordingly, the internal pressure, $P_1$, of the coolant, as determined at a leading edge of the first porous region 128 can be greater than the internal pressure, $P_2$, of the coolant, as determined at a leading edge of the second porous region 130 and/or greater than the internal pressure, $P_3$, of the coolant, as determined at a leading edge of the third porous region 132. In an embodiment, the pressure difference between $P_2$ and $P_3$ can be minimal compared to the pressure difference between $P_1$ and either $P_2$ or $P_3$. Such variability is the result of geometry, environment, operation, and the like. By way of example, a ratio of $P_1:P_2$ or $P_1:P_3$ can be in a range of 1.5:1 and 500:1, such as in a range of 2:1 and 100:1, such as in a range of 3:1 and 50:1.

As depicted in FIG. 3, coolant along the second and third supply flowpaths 130 and 132 can return to the coolant supply 300, e.g., a coolant supply tank, where it can be processed prior to returning to the leading edge of the leading edge assembly 100 along the first supply flowpath 128. In certain instances, processing can involve storing the coolant. In other instances, processing can involve actively cooling the coolant, for example using a heat removal device, such as a condenser, or passing the coolant through a heat exchanger, where a second fluid, such as fuel, could be used for heat rejection.

In an embodiment, the coolant supply structure 112 can include a circulator 304 configured to adjust a pressure of the coolant in the coolant supply structure. In an embodiment, the circulator 304 can be a variable circulator configured to adjust the pressure of the coolant within a range of pressures. The selected pressure can correspond with a pressure required to generate sufficient cooling characteristics at the leading edge, e.g., the stagnation point 102. In certain instances, the pressure can be adjusted in response to a detected heat load at one or more portions of the leading edge. The detected heat load can correspond with, e.g., a detected heat value of the outer wall 106 at the leading edge, air surrounding the outer wall 106, an inner (or partially-inner) location of the leading edge assembly 100, e.g., the inner volume 108, or the like. In certain instances, the detected heat load can be detected using a sensor or detector. The detected value can be analyzed by one or more processors to determine a pressure response and the circulator 304 can be affected to generate the determined pressure response of the coolant.

In the illustrated embodiment, the circulator 304 is depicted along the first supply flowpath 116. In other embodiments, the circulator can be disposed along the second supply flowpath 118, the third supply flowpath 120, or a combination thereof. In certain instances, the circulator 304 can include a plurality of circulators. For example, a first circulator 304 can be disposed along the first supply flowpath 116 and a second circulator 304 can be disposed along at least one of the second and third supply flowpaths 118 and 120.

Figure 4:
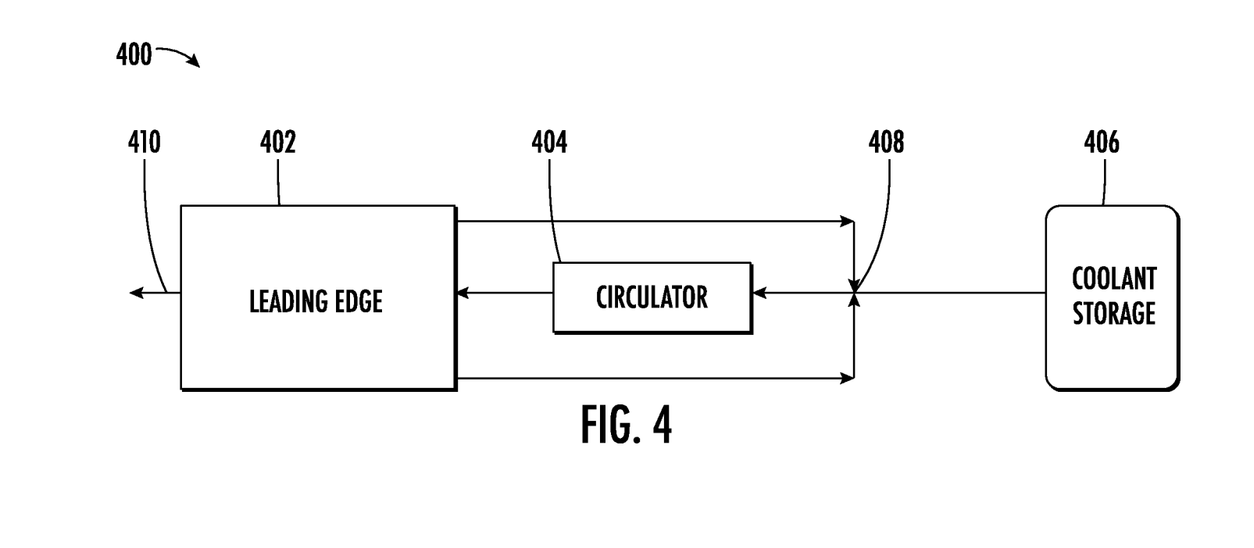
FIG. 4 is a schematic view of a cooling circuit of a leading edge assembly of a hypersonic vehicle in accordance with an exemplary embodiment of the present disclosure.

FIG. 4 illustrates a schematic view of a cooling circuit 400 for cooling the leading edge. The cooling circuit 400 includes a leading edge 402 operating under a high heat load. A circulator 404 is disposed upstream of the leading edge 402 and configured to generate a pressure of coolant to the leading edge 402. The coolant can be drawn from a coolant storage unit 406 disposed upstream of the circulator.

As depicted, the circulator 404 is disposed downstream of a recirculation entry point 408 of the coolant. In this regard, coolant from the leading edge 402 can travel in a direction back to the coolant storage unit 406 after passing through the leading edge 402 but may again travel through the circulator 404 to the leading edge 402 without entering the coolant storage unit 406. Coolant at the leading edge 402 can be ejected from the leading edge 402 along path 410 into the surrounding environment to cool the vehicle.

Figure 5:
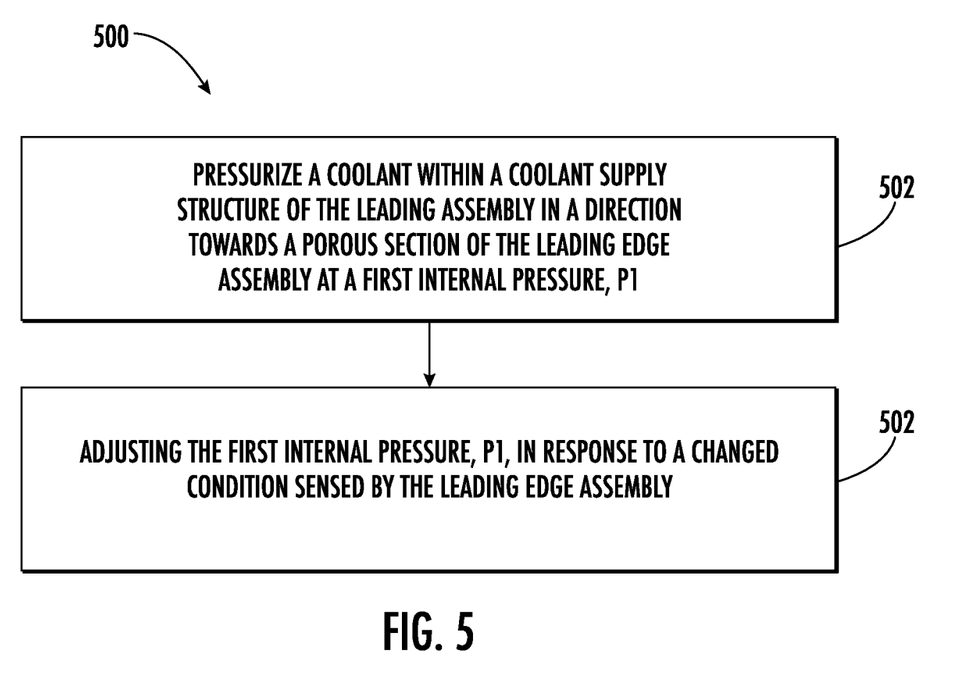
FIG. 5 is a flow chart of an exemplary method of cooling a leading edge assembly of a hypersonic vehicle in accordance with an exemplary embodiment of the present disclosure.

FIG. 5 illustrates a flowchart of an exemplary method 500 of cooling a leading edge assembly of a hypersonic vehicle. The method 500 includes a step 502 of pressurizing a coolant within a coolant supply structure of the leading edge assembly in a direction toward a porous section of the leading edge assembly at a first internal pressure, $P_1$, as measured at the leading (e.g., outermost) edge of the porous section. The step 502 can include pressurizing the coolant within a first supply flowpath of the coolant supply structure. In an embodiment, the method 500 can further include a step 504 of adjusting the first internal pressure, $P_1$, in response to a changed condition sensed by the leading edge assembly. The method 500 can also include a step of distributing the coolant to a porous section including a first porous region and a second porous region spaced apart from one another by a barrier. The first porous region can disposed at a stagnation point of the leading edge and the second porous region can be disposed adjacent to the first porous region. In internal pressure, $P_1$, of the coolant in the first porous region can be higher than an internal pressure, $P_2$, of the coolant in the second porous region.

In an embodiment, the method 500 can further include a step of detecting a condition, e.g., a heat load or interface pressure, at one or more portions of the leading edge assembly and communicating the detected condition, e.g., a condition at the interface between the leading edge assembly and the surrounding environment at one or more portions of the leading edge assembly, to a processor configured to determine an adjusted pressure of the first internal pressure. Exemplary conditions include prescribed heat loads, interface pressures, and the like. The internal pressure of coolant supplied to the leading edge can be increased in response to increased heat loads, interface pressures, and the like. Conversely, the internal pressure can be decreased in response to decreased heat loads, interface pressures, and the like.

Although exemplary cooling features are illustrated herein, it should be appreciated that any other suitable cooling features may be used while remaining within the scope of the present subject matter. In addition, or alternatively, the outer wall 106 may include any suitable number, type, geometry, and configuration of surface aberrations, protrusions, fins, or other suitable features for increasing the rate of thermal transfer. Moreover, although such thermal enhancement features are illustrated on in certain positions, it should be appreciated that such features may also be used on other surfaces of the leading edge assembly 100.

Thus, aspects of the present subject matter disclosed above present an improved leading edge assembly 100 and methods of forming the same for cooling regions of hypersonic aircraft that experience extremely high thermal loading. Notably, leading edge assembly 100, including outer wall 106 may be additively manufactured as a single, integral, and monolithic piece. In addition, the additive manufacturing methods described herein facilitate the formation of leading edge assembly 100 using any suitable material or materials and enable the formation of extremely intricate heat exchange features with high surface area for improved thermal contact between materials. In addition, the use of coolant can include circulating thermal energy from hotter regions to cooler regions of leading edge assembly 100, while phase change material can help absorb and manage the high thermal energy generated during hypersonic operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

Embodiment 1. A leading edge assembly for a hypersonic vehicle, the leading edge assembly comprising: an outer wall tapering to a leading edge, the outer wall comprising a porous section, the porous section comprising a first porous region and a second porous region; a coolant supply structure defining a first supply flowpath extending to the first porous region and a second supply flowpath extending from the first supply flowpath at a location upstream of the first porous region to the second porous region; and a coolant supply for providing a flow of a coolant through the coolant supply structure and through the porous section to cool the outer wall.

Embodiment 2. The leading edge assembly of any one of the embodiments, wherein the first porous region is disposed at a stagnation point of the leading edge, wherein the second porous region is disposed adjacent to the first porous region, and wherein the leading edge assembly is configured such that an internal pressure, $P_1$, of the coolant at the first porous region is higher than an internal pressure, $P_2$, of the coolant at the second porous region.

Embodiment 3. The leading edge assembly of any one of the embodiments, wherein the second flowpath is configured to recirculate the coolant to an area corresponding with a heat removal device.

Embodiment 4. The leading edge assembly of any one of the embodiments, further comprising one or more barriers disposed between the first and second porous regions.

Embodiment 5. The leading edge assembly of any one of the embodiments, wherein at least one of the one or more barriers is part of a sidewall of the coolant supply structure.

Embodiment 6. The leading edge assembly of any one of the embodiments, wherein the coolant supply structure further comprises a metering device within the second supply flowpath, and wherein the metering device comprises one or more metering holes disposed in a portion of the coolant supply structure.

Embodiment 7. The leading edge assembly of any one of the embodiments, wherein the one or more metering holes are disposed in a sidewall of the coolant supply structure.

Embodiment 8. The leading edge assembly of any one of the embodiments, wherein the coolant supply structure further comprises one or more impingement devices within the first supply flowpath.

Embodiment 9. The leading edge assembly of any one of the embodiments, wherein the coolant supply structure comprises a variable circulator configured to adjust a pressure of the coolant in the coolant supply structure in response to a detected heat load at one or more portions of the leading edge assembly.

Embodiment 10. The leading edge assembly of any one of the embodiments, wherein the first porous region has a first cross-sectional area, as seen along a plane intersecting the leading edge, wherein the second porous region has a second cross-sectional area, as seen along the plane intersecting the leading edge, and wherein the first cross-sectional area is larger than the second cross-sectional area.

Embodiment 11. The leading edge assembly of any one of the embodiments, wherein the porous section further comprises a third porous region, and wherein the first porous region is disposed between the second porous region and the third porous region.

Embodiment 12. The leading edge assembly of any one of the embodiments, wherein the second and third porous regions have a generally same transpiration rate, and wherein a transpiration rate of the first porous region is higher than the generally same transpiration rate of the second and third porous regions.

Embodiment 13. A leading edge assembly for a hypersonic vehicle, the leading edge assembly comprising: an outer wall tapering to a leading edge, the outer wall comprising a porous section, the porous section comprising a first porous region disposed at a stagnation point of the leading edge and a second porous region disposed adjacent to the first porous region and spaced apart therefrom by a barrier; a coolant supply structure configured to distribute a coolant from a coolant supply to the porous section, wherein an internal pressure, $P_1$, of the coolant in the first porous region is higher than an internal pressure, $P_2$, of the coolant in the second porous region.

Embodiment 14. The leading edge assembly of any one of the embodiments, wherein the coolant supply structure comprising a metering device fluidly coupled between the first porous region and the second porous region.

Embodiment 15. The leading edge assembly of any one of the embodiments, wherein the porous section further comprises a third porous region, and wherein the first porous region is disposed between the second porous region and the third porous region.

Embodiment 16. A method of cooling a leading edge assembly for a hypersonic vehicle, the method comprising: pressurizing a coolant within a coolant supply structure of the leading edge assembly in a direction toward a porous section of the leading edge assembly at a first internal pressure, $P_1$; and adjusting the first internal pressure, $P_1$, in response to a changed condition sensed by the leading edge assembly.

Embodiment 17. The method of any one of the embodiments, wherein the porous section includes a first porous region and a second porous region spaced apart from one another by a barrier, wherein the first porous region is disposed at a stagnation point of the leading edge, wherein the second porous region is disposed adjacent to the first porous region, and wherein the first internal pressure, $P_1$, of the coolant in the first porous region is higher than a second internal pressure, $P_2$, of the coolant in the second porous region.

Embodiment 18. The method of any one of the embodiments, further comprising modulating the internal pressure of at least one of the first and second porous regions in response to a determined heat load at one or more portions of the leading edge assembly.

Embodiment 19. The method of any one of the embodiments, further comprising: detecting a heat load or interface pressure at one or more portions of the leading edge assembly; and communicating the detected heat load or interface pressure to a processor configured to determine an adjusted pressure of the first internal pressure, $P_1$.

Embodiment 20. The method of any one of the embodiments, wherein determining the adjusted pressure comprises: increasing the first internal pressure in response to increased head loads or increased interface pressure; and decreasing the first internal pressure in response to decreased heat loads or decreased interface pressure.

What is claimed is:

1. A leading edge assembly for a hypersonic vehicle, the leading edge assembly comprising:
    an outer wall tapering to a leading edge, the outer wall comprising a porous section, the porous section comprising a first porous region and a second porous region;
    a coolant supply structure defining a first supply flowpath extending to the first porous region and a second supply flowpath extending from the first supply flowpath at a location upstream of the first porous region to the second porous region; and
    a coolant supply for providing a flow of a coolant through the coolant supply structure and through the porous section to cool the outer wall.

2. The leading edge assembly of claim 1, wherein the first porous region is disposed at a stagnation point of the leading edge, wherein the second porous region is disposed immediately adjacent to the first porous region, and wherein the leading edge assembly is configured such that an internal pressure, $P_1$, of the coolant as measured at an outermost surface at the first porous region is higher than an internal pressure, $P_2$, of the coolant as measured at an outermost surface at the second porous region.

3. The leading edge assembly of claim 1, wherein the second supply flowpath is configured to recirculate the coolant to an area corresponding with a heat removal device.

4. The leading edge assembly of claim 1, further comprising one or more barriers disposed between the first and second porous regions.

5. The leading edge assembly of claim 4, wherein at least one of the one or more barriers is part of a sidewall of the coolant supply structure and defines in part the first supply flowpath, the second supply flowpath, or both.

6. The leading edge assembly of claim 1, wherein the coolant supply structure further comprises a metering device within the second supply flowpath, and wherein the metering device comprises one or more metering holes disposed in a portion of the coolant supply structure.

7. The leading edge assembly of claim 6, wherein the one or more metering holes are disposed in a sidewall of the coolant supply structure.

8. The leading edge assembly of claim 1, wherein the coolant supply structure further comprises one or more impingement devices within the first supply flowpath.

9. The leading edge assembly of claim 1, wherein the coolant supply structure comprises a variable circulator configured to adjust a pressure of the coolant in the coolant supply structure in response to a detected heat load at one or more portions of the leading edge assembly.

10. The leading edge assembly of claim 1, wherein the first porous region has a first cross-sectional area, as seen along a plane intersecting the leading edge, wherein the second porous region has a second cross-sectional area, as seen along the plane intersecting the leading edge, and wherein the first cross-sectional area is larger than the second cross-sectional area.

11. The leading edge assembly of claim 1, wherein the porous section further comprises a third porous region, and wherein the first porous region is disposed between the second porous region and the third porous region, wherein the second and third porous regions have a generally same transpiration rate, and wherein a transpiration rate of the first porous region is higher than the generally same transpiration rate of the second and third porous regions.

12. The leading edge assembly of claim 1, wherein the second supply flowpath defines an inlet in flow communication with the first supply flowpath.

13. A leading edge assembly for a hypersonic vehicle, the leading edge assembly comprising:
    an outer wall tapering to a leading edge, the outer wall comprising a porous section, the porous section comprising a first porous region disposed at a stagnation point of the leading edge and a second porous region disposed adjacent to the first porous region and spaced apart therefrom by a barrier;
    a coolant supply structure configured to distribute a coolant from a coolant supply to the porous section, wherein an internal pressure, $P_1$, of the coolant in the first porous region is higher than an internal pressure, $P_2$, of the coolant in the second porous region as measured at the outer surface.

14. The leading edge assembly of claim 13, wherein the coolant supply structure comprising a metering device fluidly coupled between the first porous region and the second porous region.

15. The leading edge assembly of claim 13, wherein the porous section further comprises a third porous region, and wherein the first porous region is disposed between the second porous region and the third porous region.

16. A method of cooling a leading edge assembly for a hypersonic vehicle, the method comprising:
    pressurizing a coolant within a coolant supply structure of the leading edge assembly in a direction toward a porous section of the leading edge assembly at a first internal pressure, $P_1$, as measured at a leading edge of the porous section; and
    adjusting the first internal pressure, $P_1$, in response to a changed condition sensed by the leading edge assembly.

17. The method of claim 16, wherein the porous section includes a first porous region and a second porous region spaced apart from one another by a barrier, wherein the first porous region is disposed at a stagnation point of the leading edge, wherein the second porous region is disposed adjacent to the first porous region, and wherein the first internal pressure, $P_1$, of the coolant in the first porous region is higher than a second internal pressure, $P_2$, of the coolant in the second porous region.

18. The method of claim 17, further comprising modulating the internal pressure of at least one of the first and second porous regions in response to a determined heat load at one or more portions of the leading edge assembly.

19. The method of claim 16, further comprising:
    detecting a heat load or interface pressure at one or more portions of the leading edge assembly; and
    communicating the detected heat load or interface pressure to a processor configured to modulate pressure of the first internal pressure, $P_1$.

20. The method of claim 19, wherein modulating pressure comprises:
    increasing the first internal pressure in response to increased head loads or increased interface pressure; and decreasing the first internal pressure in response to decreased heat loads or decreased interface pressure.

\* \* \* \* \*